United States Patent [19]
Santos-Gomez

[11] Patent Number: 6,104,393
[45] Date of Patent: Aug. 15, 2000

[54] INTEGRATION OF PROCEDURAL AND OBJECT-ORIENTED USER INTERFACES

[75] Inventor: Lucinio Santos-Gomez, Durham, N.C.

[73] Assignee: International Business Machines Corporation, Armonk, N.Y.

[21] Appl. No.: 09/095,994

[22] Filed: Jun. 11, 1998

[51] Int. Cl.[7] .................................................. G06F 3/00
[52] U.S. Cl. ..................... 345/336; 345/338; 345/339; 345/348; 345/967
[58] Field of Search .................................... 345/333–334, 345/336, 338–339, 342, 348, 356, 433, 435

[56] References Cited

U.S. PATENT DOCUMENTS

| | | | |
|---|---|---|---|
| 4,873,643 | 10/1989 | Powell et al. | 345/435 X |
| 5,490,246 | 2/1996 | Brosky et al. | 345/342 |
| 5,544,302 | 8/1996 | Nguyen | 345/348 X |
| 5,617,114 | 4/1997 | Bier et al. | 345/433 X |
| 5,754,176 | 5/1998 | Crawford | 345/338 |
| 5,900,870 | 5/1999 | Malone et al. | 345/333 |
| 6,014,138 | 1/2000 | Cain et al. | 345/356 X |

Primary Examiner—Raymond J. Bayerl
Assistant Examiner—X. L. Bautista
Attorney, Agent, or Firm—Jeanine S. Ray-Yarletts; Marcia L. Doubet

[57] ABSTRACT

A technique, system, and computer program for integrating procedural user interfaces and object-oriented user interfaces. This integration enables the useful features and advantages of task wizards to be available to a user of an object-oriented user interface, and vice versa. The prompting approach of wizards is used during modification, as well as during creation, of objects and their components. A graphical canvas, depicting these components and their interrelationships, is built incrementally during the object creation process. This same graphical canvas is used during modification, enabling direct selection and manipulation of components to be changed. Efficient use is made of the display screen, enabling information to be viewable without a proliferation of windows, and presenting relevant information to the user at the time he needs it. Nested wizards may be used, which allow the user to access a different wizard that will facilitate creation of a complex object or component referenced by the create process of a first wizard.

15 Claims, 9 Drawing Sheets

FIG. 3B

File  Edit  View

Create/Edit automations  101
- Disk space usage
- Paging space
- Backup
- Weekdays
- Weekends
- Server down
- CPU peeks New Automation Monitor — IF — Greater than ▼ 60% ▼ — Severity Critical ▼ — Response And Page Send E-mail 111  113  114  115
112
Disk space Would you like to add another task/automation to the response?  ○ Yes  ● No  <  Next>
154  153

| Single Probes | Event Rules | Timers | Tasks |
|---|---|---|---|

Send E-mail

Common                    Platforms                        Roles required
Page                      ☑ Sparc/SunOS    ☑ Motorola 88k   ☑ Admin    ☐ Install Client
Send E-mail               ☑ Sparc/Solaris  ☐ NT             ☐ Senior   ☐ Super
p$                        ☑ Pa-risc/HPUX   ☐ Win95          ☐ User     ☐ All
Send event                ☐ IBM rs6000/AIX ☐ All
Find                           Privileges                   Arguments
Enter queue               User Name: _____                Event 1  ▶
Exit queue                Group Name: _____               Paging number _____
Intersection
Union

INTEGRATION OF PROCEDURAL AND OBJECT-ORIENTED USER INTERFACES

BACKGROUND OF THE INVENTION

1. Field of the Invention

The present invention relates to a graphical user interface, and deals more particularly with a method and apparatus for integrating procedural user interfaces and object-oriented user interfaces. This integration enables the useful features and advantages of task wizards to be available to a user of an object-oriented user interface, and vice versa.

2. Description of the Related Art

Computer users have become accustomed to using computer software applications which present information through a graphical user interface ("GUI"). GUIs typically include windows, buttons, and other graphical elements, in contrast to the text-only interfaces that preceded them. A graphical user interface may alternatively be referred to as an object-oriented user interface ("OOUI"), reflecting the fact that the user of this type of interface interacts with objects, which are visibly displayed using a graphical representation. Typical graphical object representations include icons to represent application programs or files, and container folders (where a folder is also an icon) to represent collections of other objects. Users of this type of interface typically interact with the underlying software application by moving a pointing cursor over an object using, for example, a mouse or similar pointing device such as a light pen, and then indicating (for example, by clicking a mouse button or pressing the light pen) that the object should be selected. Alternatively, a touch-sensitive display screen can be used. In that situation, the user interacts with the software application by touching the object he wishes to select.

The programmer writing a software application having an object-oriented user interface defines the physical layout of the graphical objects on the user interface screen, as well as the functioning of the objects and any logical relationships among those objects. The function represented by an object can be as simple as setting the value of a variable used by the software application, or it can represent a more complex function such as initiating the execution of a software subroutine, or any other function desired by the programmer.

Some tasks to be performed by a software user are procedural in nature. That is, the task can be broken down into logical subtasks, which are performed in some sequence. The steps of the sequence, and the relationship between the steps, are important. The introduction of "wizards" (also known as "task guides") has facilitated completion of procedural tasks in software products. A wizard is a procedurally-oriented process (typically using a textual, as opposed to object-oriented, user interface), provided as part of a software application, that guides a user through the steps of a particular procedure or task. Wizards are typically used to perform goal-oriented tasks that are performed infrequently, and that require a long and often-complicated sequence of well-defined steps. Examples of this type of task are administrative functions, such as configuration and installation. Initial configuration of a computer network, for example, involves defining the physical objects of the network, the characteristics of each object, and the links or routes between objects (including the characteristics of the links). A configuration wizard will guide the user through answering the myriad of questions required for this process.

For routine, day-to-day operations, however, an object-oriented interface is provided, and wizards are not typically available. This separation of interfaces—object-oriented for "normal" operations, and wizard-based for infrequent, complicated operations—leads to a number of disadvantages for the user. The advantages of object-based interfaces, with their easy and direct object selection and manipulation capability, are not available in the step-by-step wizard interface. The advantages of the wizard interface, providing guidance and progress feedback while performing an operation, are not available in object-based interfaces. Further, the requirement of using two completely different interfaces at different times, for the same software application, is confusing to users and limits their ability to easily learn how to use the software. That is, when the user sees a prompting, wizard interface during creation of objects, this helps him to learn about the object's properties, relationships to other objects, and relationships between properties. When this same user comes back to the same objects at a later time (for example to modify the properties of an object), the guidance is no longer available; questions required for setting properties may be presented in a different order, or using different phrasing; etc.—which makes it very difficult to transfer what was learned from the wizard interface for use with the object interface.

Accordingly, a need exists for a technique by which procedural and object-oriented interfaces can be integrated, making available the advantages of each. This integration makes the underlying software application easier to use, because the user only needs to learn one interface. The proposed technique provides an object interface that is incrementally built as the user interacts with a wizard, which is referred to herein as a "graphical canvas". When the user later wants to modify properties of the objects created with the wizard, the same graphical canvas is displayed. Objects can be selected from this graphical canvas, causing their properties to be displayed—in the same manner in which the user saw them during the creation process. The guidance of the wizard is available for making changes to the object properties.

SUMMARY OF THE INVENTION

An object of the present invention is to provide a technique whereby procedural and object-oriented interfaces can be integrated, making available the advantages of each.

Another object of the present invention is to provide a technique that makes a software application easier to use and to learn, by presenting one consistent interface for creation and for modification.

Still another object of the present invention is to provide a technique whereby an object interface is incrementally built as the user interacts with a wizard, and is displayed later to enable modifying the objects.

Yet another object of the present invention is to accomplish the afore-mentioned benefits while conserving display screen space.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer-readable code implementing a software process for providing an integrated interface for creation and modification of objects, comprising: a subprocess for creating objects; a subprocess for modifying objects; and a subprocess for displaying a graphical canvas, upon which said created and modified objects are visually represented. Preferably, said subprocess for creating objects further comprises a subprocess for using a prompting wizard approach, and said subprocess for modifying objects further comprises a subprocess for using said prompting wizard approach. Further, said subprocess for creating objects preferably further comprises a subprocess for nesting in said prompting wizard approach. Additionally, said subprocess for displaying a graphical canvas preferably further comprises a subprocess for incrementally building said visual object representation responsive to said subprocess for creating objects, and said subprocess for displaying a graphical canvas preferably further comprises a subprocess for displaying a visual indicator of a status of said visually represented objects.

The present invention will now be described with reference to the following drawings, in which like reference numbers denote the same element throughout.

BRIEF DESCRIPTION OF THE DRAWINGS

FIGS. 3A–3E depict representative screen layouts that the user may encounter while using an embodiment of the present invention.

DESCRIPTION OF THE PREFERRED EMBODIMENT

Figure 1:
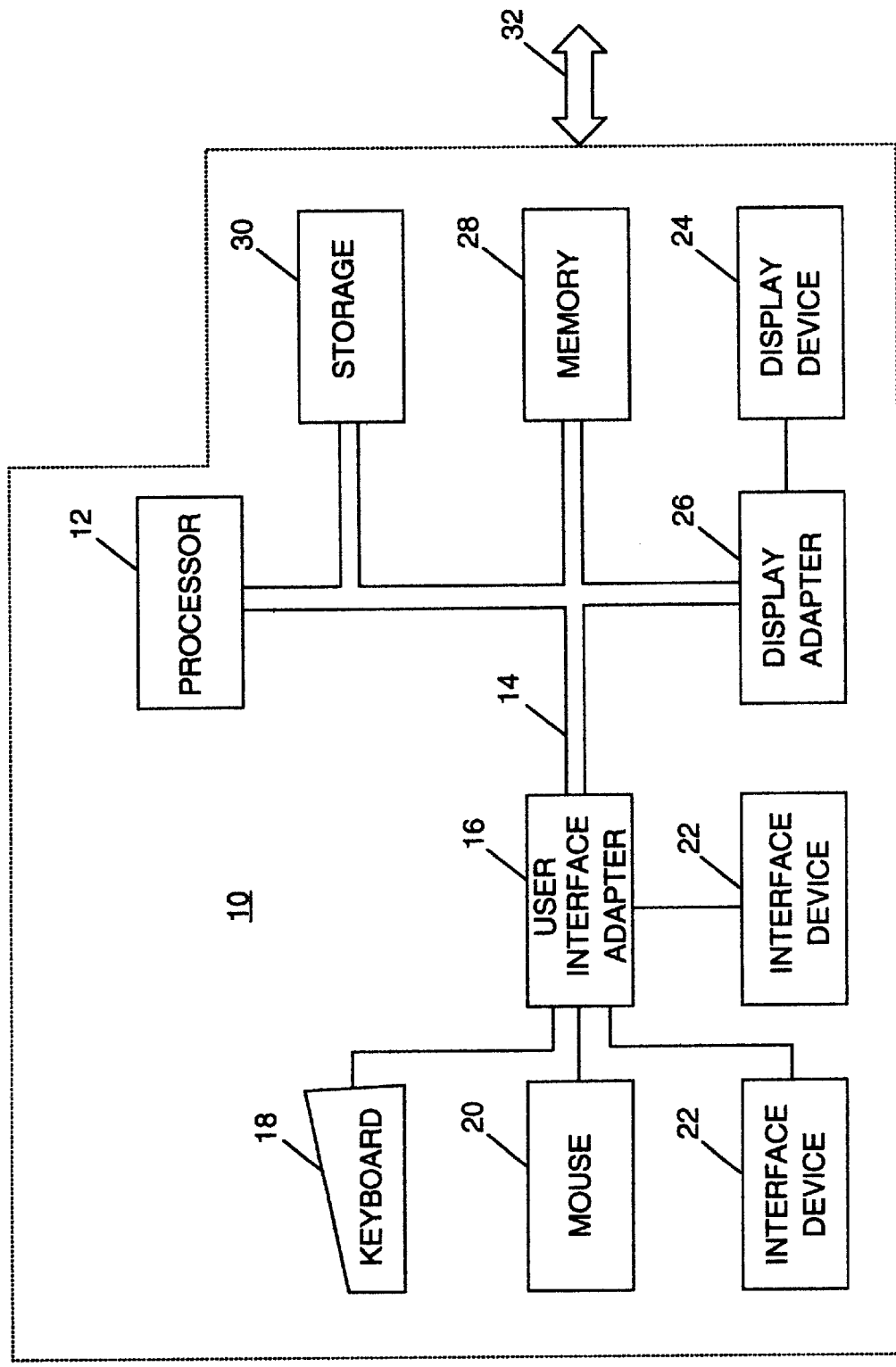
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), the workstation 10 can be a client in a client/server arrangement with another computer, it may be a standalone computer not connected in a network, etc. All of these configurations, as well as the appropriate communications hardware and software, are known in the art.

Figure 2:
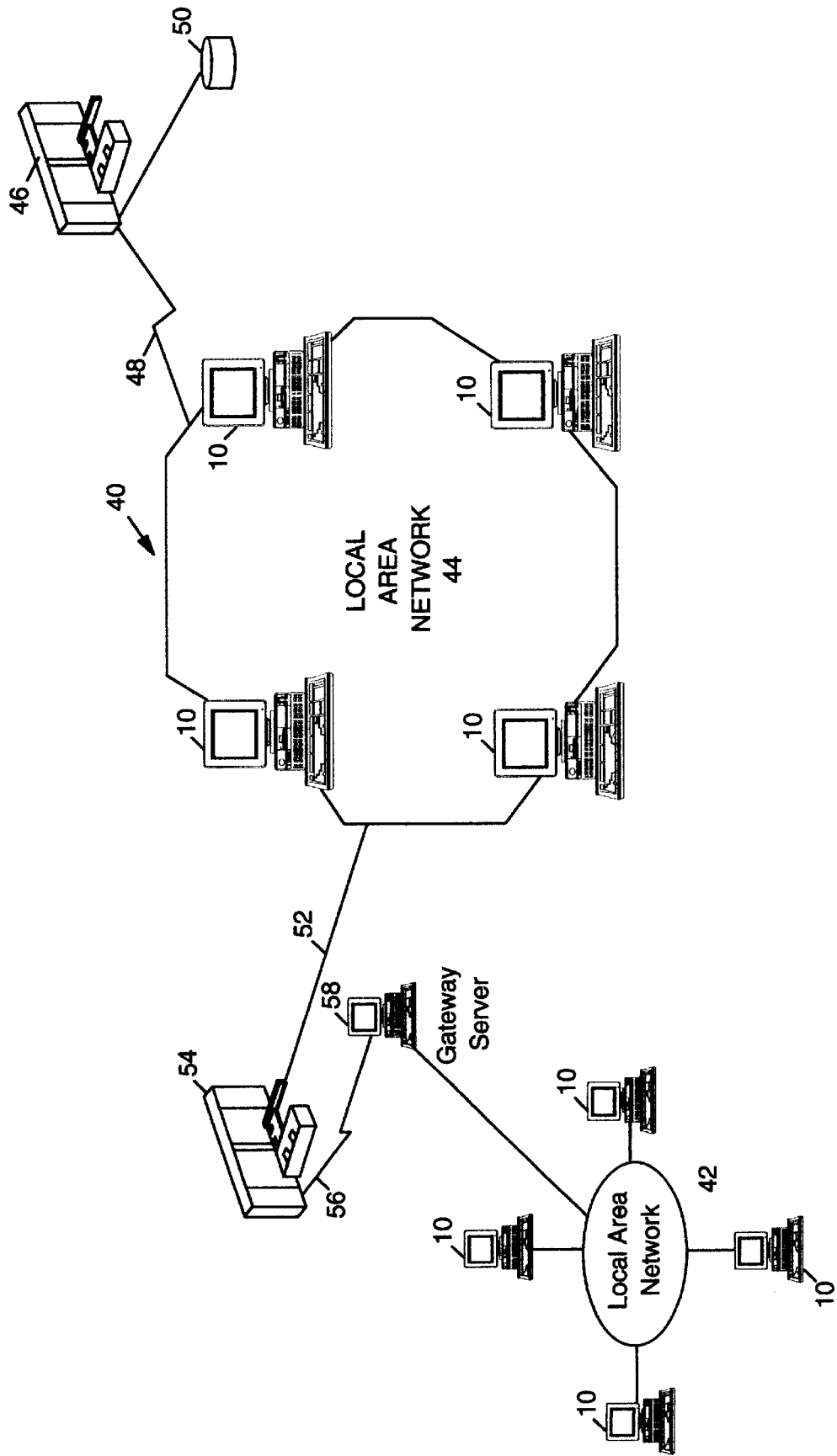
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM), or any other type of mainframe computer. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The graphical canvas resulting from use of the present invention may be displayed on any of the various display devices 24, and accessed using any type of interface device such as a keyboard 18, mouse 20, and/or other interface devices 22 (including a touch sensitive screen, digitized entry pad, etc.).

The preferred embodiment of the present invention will now be discussed with reference to FIGS. 3 and 4.

In the preferred embodiment, the present invention is implemented as a computer software program. The implementation of the invention may be used with any software application, but will be particularly advantageous for any application that has long, complicated steps for creation and/or modification of objects. The invention is particularly well-suited to administrative tasks such as configuration or installation, but may be used in other environments as well. For example, the integrated interface can be used in software applications that create automation routines, such as procedures that automatically monitor a computer system for occurrence of specified events and trigger invocation of a specified response when the events are detected. Or, the integrated interface can be used to build a software application, by guiding the user through the process of defining the software objects, relationships, etc. The application may execute entirely on the user's computer, as a stand-alone software package, or it may execute partly on the user's computer and partly on a remote computer. In the latter scenario, the remote computer may be connected to the user's computer through a LAN or a WAN that is part of a network owned or managed internally to the user's company, or the connection may be made to an external computer (for example, through the Internet using an Internet Service Provider).

FIGS. 3A–3E depict representative screen layouts that the user may encounter while using an embodiment of the present invention. These figures also illustrate how the wizard interface and object-oriented interface have been integrated, providing one easy-to-use and easy-to-understand interface for both the creation and the modification processes.

Figure 3A:
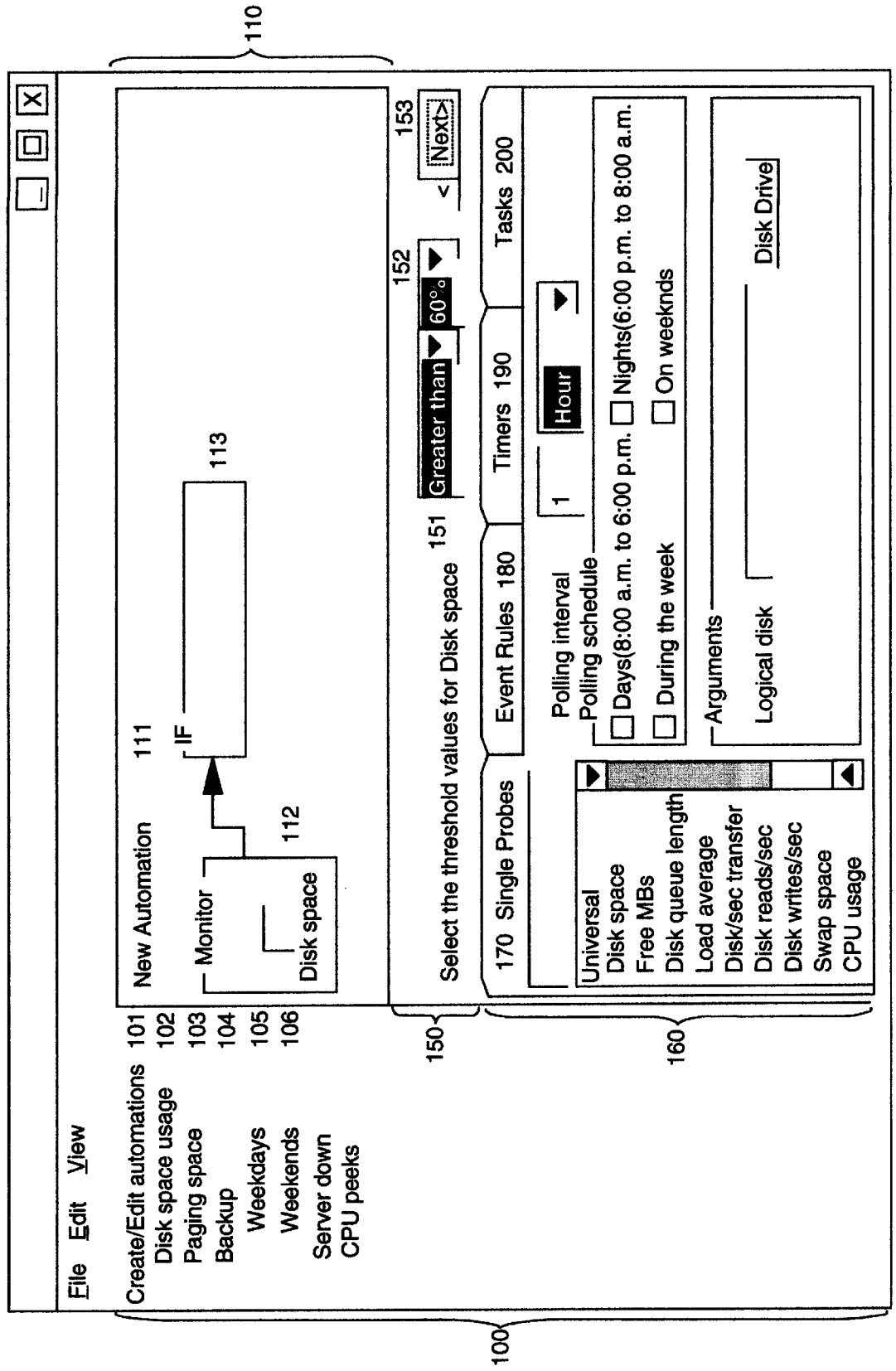

FIG. 3A shows the layout of the display screen used in the preferred embodiment, as well as examples of the objects available to the user. In the "target object area" 100, the target objects that are available to the user (having been created using a prior invocation of the software application) are displayed. "Target objects" are those that are the subject of the user's actions. For example, FIG. 3A shows a list of automation objects, as indicated at 101, such as a "Disk space usage" automation 102, a "Paging space" automation 103, a "Backup" automation (which itself contains automations 105 and 106), etc. Optionally, a grouping relationship may exist among the target objects, such as the tree structure shown here (where the root of the tree is at 101). The actions performed on target objects include Create and Modify (which may be referred to equivalently as "Edit"). Optionally, the information in the target object area 100 may be made available to the user without displaying this area on the display screen. For example, a pop-up window could be used, which the user would request (by pressing a specific function key, or other application-defined technique) when he wanted to see the list of target objects. By removing area 100 from the screen, more space is available for the other information that will be used during the creation and modification processes. See, for example, FIGS. 3C–3E.

Figure 3C:
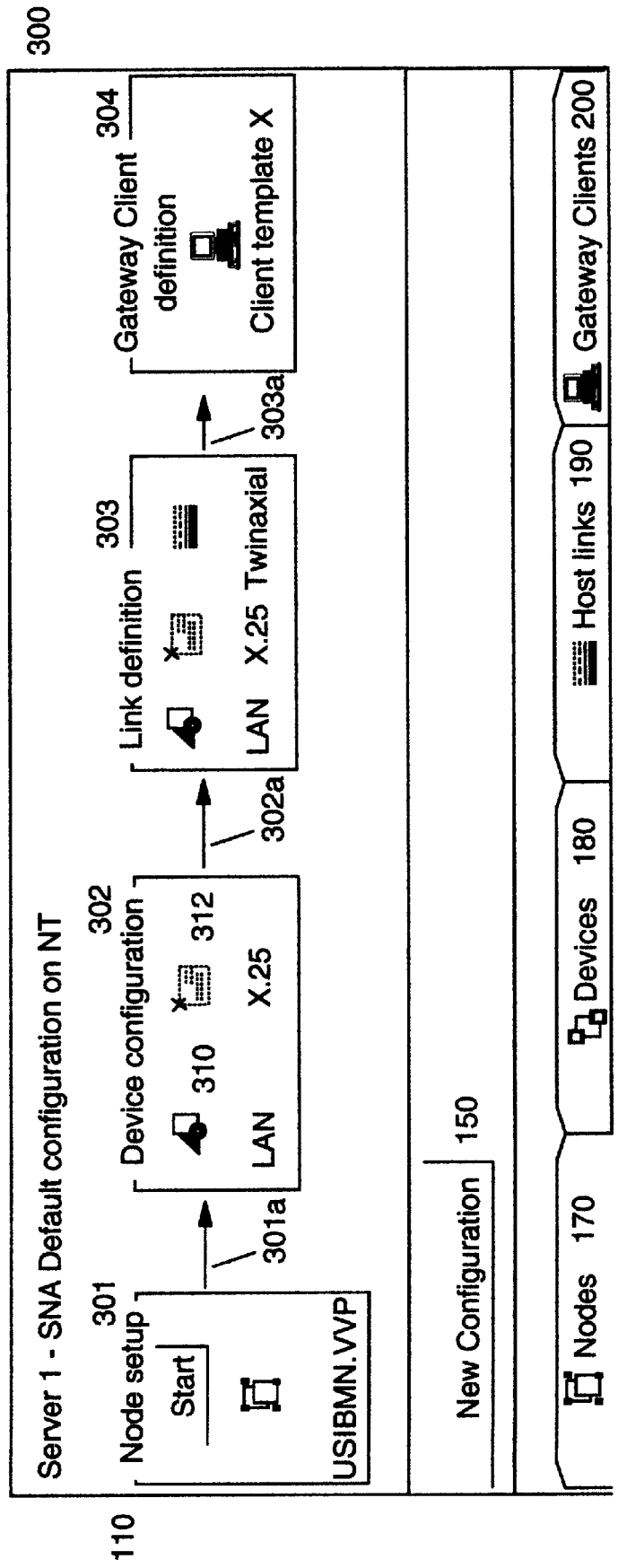

In the "graphical canvas" area 110, the target object components of a selected target object are shown. "Target object components" are subparts of the target object. For example, when the target object is a software application in an object-oriented language, methods that implement the application logic will be target object components. Or, when the target object is an automation routine, as depicted in FIG. 3B (see 101 and 111), a component will be the condition 113 that triggers the automated execution; other components include the object 112 being monitored, and the response 114. When the target object is a configuration, as shown in FIG. 3C, components will include the services that are being configured. This graphical canvas is built incrementally as the user creates a new target object, as stated previously. As the components are displayed, relationships between them are also depicted on the graphical canvas. Typical relationships include sequential, containment, and hierarchical, which are discussed in more detail below (with reference to FIGS. 3C–3E). The actions performed on target object components include Create and Modify.

The "wizard area" 150 is where information related to the particular step of the current creation or modification procedure is displayed. Prompting messages for creation or modification of target objects and their components are displayed here, such as message 151. Additionally, options such as 152 that correspond to the prompting messages may be displayed here. Options that are displayed in the wizard area typically request a limited amount of information from the user, in order to confine the wizard area to a relatively small amount of display space. Drop-down lists, such as those provided for option 152, or radio buttons, such as shown at 154, may be provided for the user to make his selection. Navigational mechanisms, such as a "Next" button 153 and a "Back" button, are preferably displayed in the wizard area, to control the flow through the creation or modification process.

The "details notebook area" 160 displays the properties, and their corresponding values, of the target object components. "Properties" of a target object component are attributes of the component. For example, when the component is a software method, a property may be a value of a variable used by that method. When the component is a response (such as 114) to be triggered by an automation routine, a property may be an address to which an e-mail message 115 will be sent. Or, when the component is a configuration service, a property may be the port number of that service. The details notebook may contain a number of notebook tabs, such as tabs 170, 180, 190, 200, when more properties exist than can be conveniently displayed in a single window of the details notebook 160. The actions that may be performed on properties include Assign Value. Preferably, the value of a property is assigned by interacting with a prompting message in the wizard area 150.

FIG. 3C shows a graphical canvas for a target object where the components of the target object have a sequential relationship to each other. That is, the user must define component 301 before proceeding to component 302, which must be defined before proceeding to component 303, etc. This is graphically indicated by the arrows 301a, 302a, 303a. The sequential relationship shown here is used for a physical configuration definition process, wherein the properties of the node 301 are defined before moving on to specify the properties of the device 302 on which the node resides, the device 302 properties dictate the allowable choices of properties for the link 303, etc. Note that using the sequential relationship for configuration is merely the preferred method of defining a physical configuration, and the one that will be considered herein. It would be possible to define properties of configuration components in isolation, but such a process would not enable leading the user through the interrelationships (with the wizard) in a meaningful way.

Figure 3D:
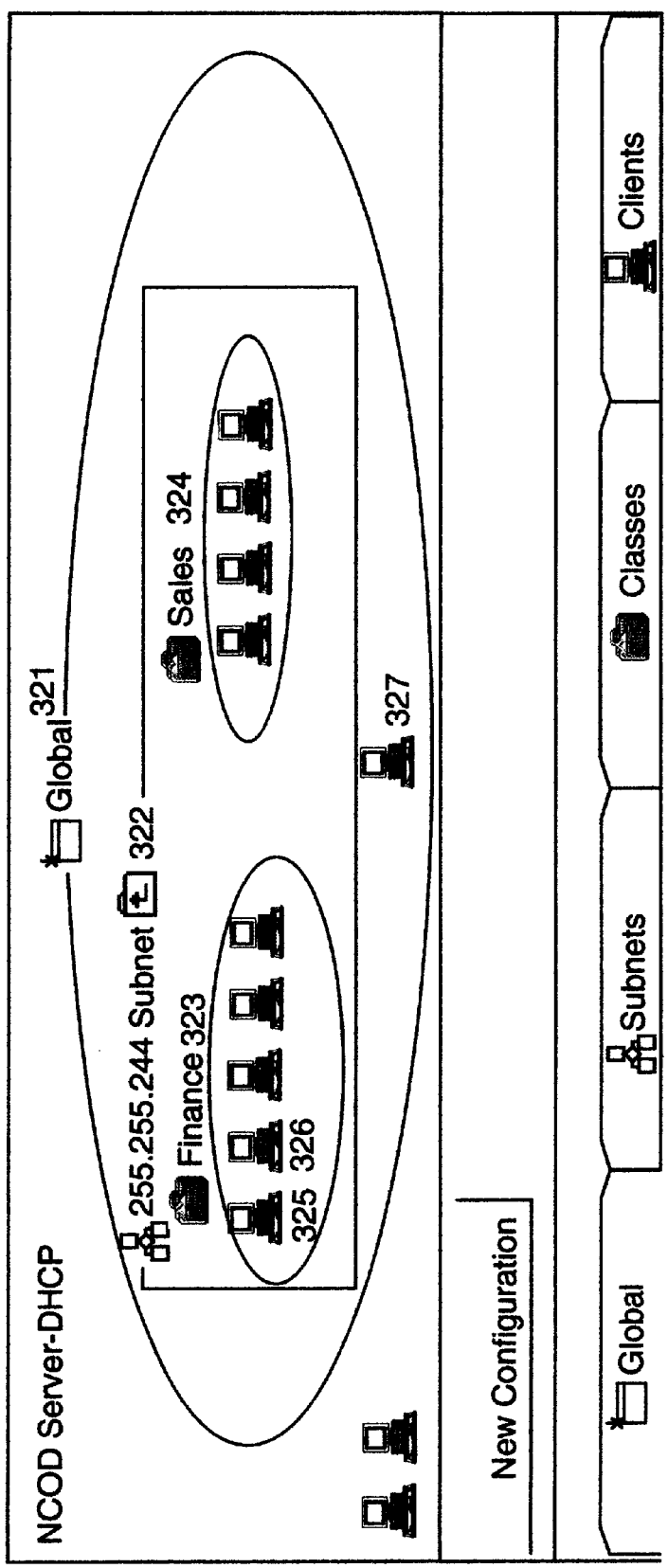

FIG. 3D shows a graphical canvas for a target object where the components of that object have a containment relationship. This is sometimes referred to as "nested components", or a nesting relationship. As shown in this example, the Global component 321 contains one or more other components, namely the Subnet component 322. In turn, the Subnet component 322 contains Finance 323 and Sales 324 components, which are peers of each other. The Finance component 323 further contains components 325, 326, etc., represented by icons. A containment approach to configuration may be useful when components inherit properties from other components.

Figure 3E:
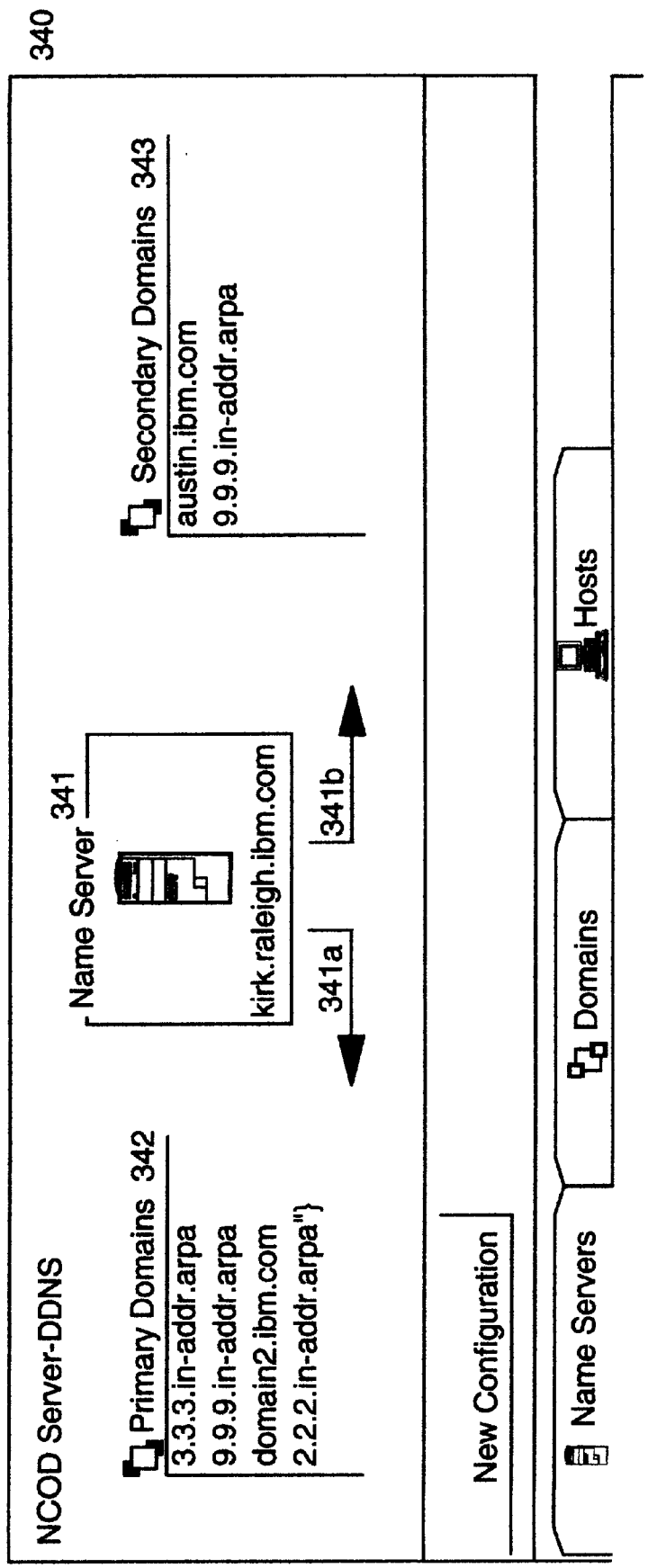

FIG. 3E shows a graphical canvas for a target object where the components of that object have a hierarchical containment relationship. As shown in this example, component 341 is at a higher level of a hierarchy than either component 342 or component 343. This is graphically indicated by the arrows 341*a* and 341*b*.

Figure 4:
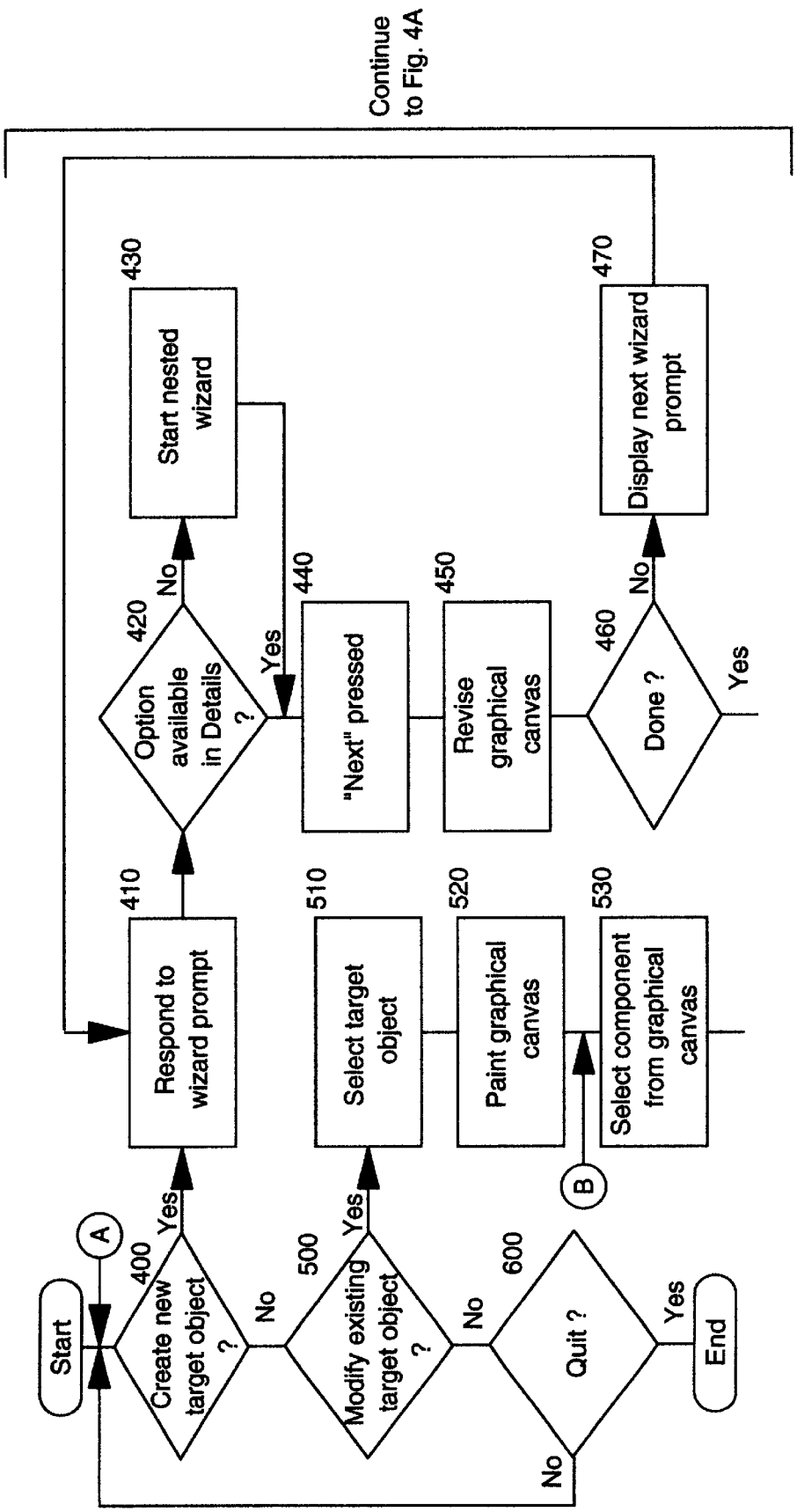
FIG. 4 illustrates a flow chart which sets forth the logic involved with the present invention to provide an integrated interface in a software application.
Figure 4A:
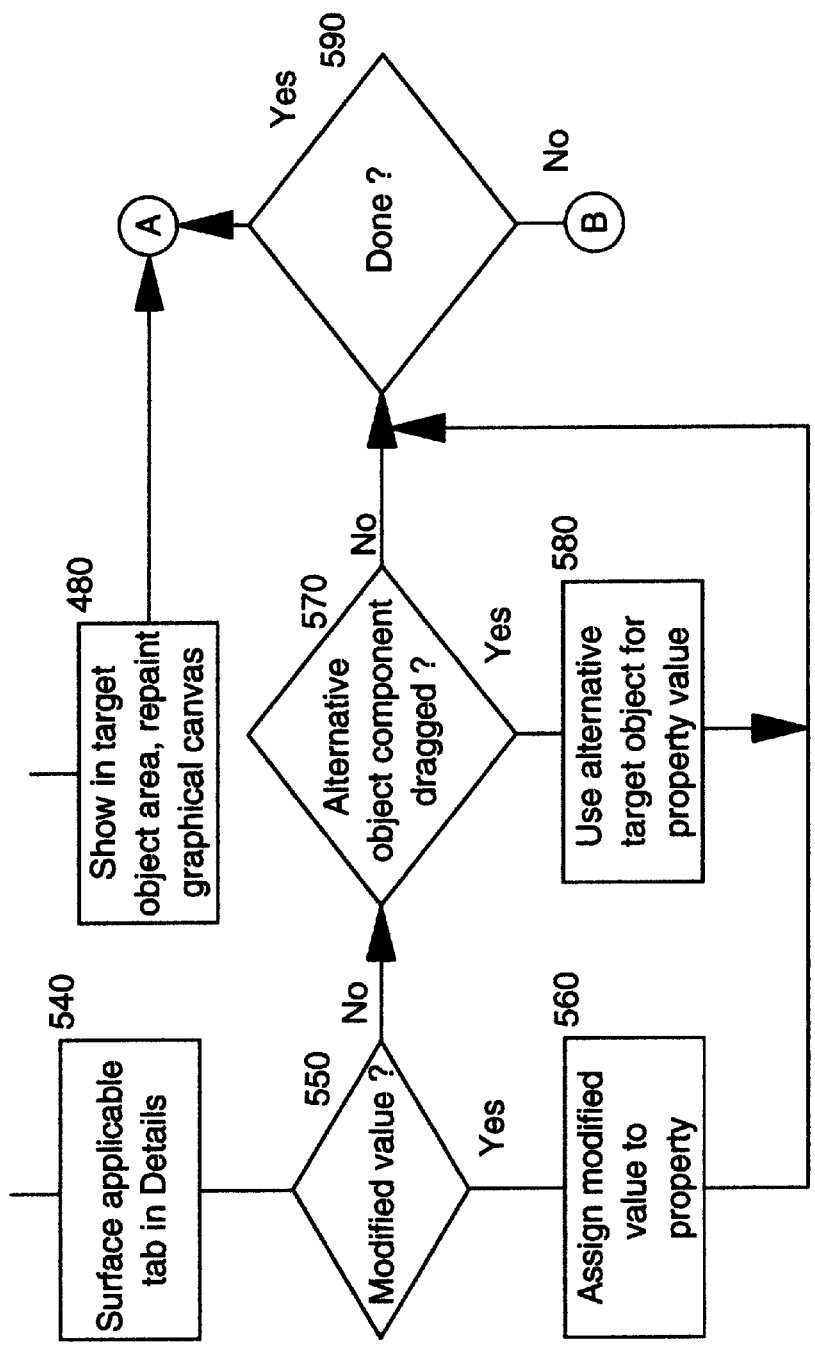

FIG. 4 illustrates the logical steps that may be performed by an implementation of the present invention, whereby the user interface for creation and modification are integrated to provide the benefits of both object-oriented and wizard-based approaches.

The process begins at Block 400, after the user has invoked the software application. At Blocks 400, 500, and 600, the user can choose to create a new target object, modify an existing target object, or quit using this application. Other choices may be added without deviating from the inventive concepts of the present invention, using techniques which are well known in the art.

Step 400 asks whether the user has requested to create a new target object. If the answer is "Yes", control transfers to Block 410 to begin the object creation process; otherwise, control continues on to Block 500.

At Block 410, the first wizard prompt for creating the new target object has been displayed, and the application waits for the user to respond to this prompt. The present invention can be used in any number of applications, and the text of this first wizard prompt (as well as the subsequent wizard prompts) will be application-dependent. Therefore, FIG. 4 presents a generic approach to the creation process (as well as to the modification process, described below with reference to Blocks 500 through 590). It will be obvious to one of ordinary skill in the art how FIG. 4 may be altered to optimize the code for a specific application, using the logic that is provided herein as a basis.

Block 420 asks whether the option selected is already available in the Details notebook. As stated previously, wizard prompts may make use of drop-down lists, radio buttons, etc. When the answer to a prompt involves specifying a complex option, such as a selecting a task in response to an automation threshhold as shown at 115, this logic of Block 420 checks to see if the user has already fully defined that option. (Obviously, when the wizard prompt can be answered "Yes" or "No", or when the answer is a simple data type such as a number, the check of Block 420 is not required.) When Block 420 has a negative response, Block 430 allows the user to invoke a nested wizard (or "subwizard"), to guide him through the process of creating the option he has selected. Typically, Block 430 will be implemented as a recursive invocation of the logic of FIG. 4; upon completing the creation of the nested wizard process, control will then return to Block 440. Upon reaching Blocks 420 and 430 during the recursive invocation, another recursive invocation may be started if necessary. Optionally, an implementation may provide the user with the choice of whether he would like to perform the nested wizard process in-line, as shown in FIG. 4, or wait to create the selected object at another time. In this latter case, the main-line creation process will continue, as if the user is creating "stubs", or place holders, for the referenced objects. This approach enables the user to focus on creation of the main object, and take care of the details separately.

Control reaches Block 440 when the selected option was already available, or has been created using a nested wizard (or when the user indicated he preferred to stay in the main-line creation process, as discussed above). At Block 440, the user selects a navigational control to continue on with the creation process, such as by pressing a button labeled "Next". A "Back" button may also be depicted, to allow the user to go backwards in the creation process (e.g. to see the details of a previously-defined property, or to change a previously-defined value), using techniques which are well known in the art. When he has indicated in this way that he is ready to move on, Block 450 revises the graphical canvas to show the target object component that has just been defined. Incrementally building the graphical canvas in this manner gives the user immediate, graphically-oriented visual feedback on his progress in the creation process. Preferably, the manner in which the components are displayed on the graphical canvas spatially indicates their interrelationships. These techniques enable the user to learn about the target object, its components, their relationships, and allowable values for properties, as he goes through the creation process. This should enable him to understand the target objects, and more easily and accurately make modifications when needed.

Preferably, the graphical canvas will show one representation for a target object component that is fully defined, and a different representation for the same component when it has not been fully defined or when it contains invalid or inconsistent values for properties. This provides a visual feedback cue to the user of the status (finished, not finished, invalid, etc.) of each component, and of the overall target object. See for example FIG. 3C, where component 310 is displayed using normal font, but component 312 is displayed using an outline font. Other visual differences may be used to provide the same indication.

Block 460 asks whether the creation process for this target object is done. If the test has a negative response, Block 470 displays the next sequential wizard prompt, as defined by the specific application implementing the present invention. Control then returns to Block 410, repeating the process of answering this prompt.

Block 480 is reached when the current target object has been fully defined, as indicated by a positive response at Block 460. As indicated in Block 480, the target object area 100 is preferably updated at this point to show this new object among with the other target objects that have been defined. When the list 101 is structured, a wizard prompt may be used to ask the user where in this structure the new object should be placed. The graphical canvas area 110 may also be repainted, to show this new object as fully defined if it is not already shown as such. Control then returns to Block 400.

Block 500 asks whether the user wants to modify an existing target object. When he has chosen this option, Block 510 indicates that the user then selects the object to be modified. Preferably, this will be done by displaying the available target objects in the target object area 100, and allowing the user to select one of these objects (e.g. by double-clicking with the pointing cursor). Other approaches are possible as well, such as displaying a drop-down list containing the available objects, and allowing the user to select an object from this list.

Block 520 paints the graphical canvas 110 with the object components that are currently defined for this target object, including visually depicting relationships that were defined between components.

At Block 530, the user selects one of the displayed object components that he wishes to modify. Preferably, this selection will be done by moving the pointing cursor over the component, and double-clicking or otherwise indicating selection (for example, by pressing a function key designated as implementing the "select" functionality). Block 540 then surfaces the applicable tab in the details notebook 160, which contains information about properties of the selected component. Typically, the user will want to modify the value of one or more of these properties. Block 550 implements this choice, by assigning the modified value to the selected property. Depending on the number of properties that exist for the selected component, the application programmer may choose to write the application to request all information on property values through wizard prompts in the wizard area 150, or request some information there and other information from the details notebook area 160. What is required is that a property is selectable by the user, and that the user is then guided in responding with a new value for that property. The guidance provided may be as simple as displaying a window into which the user types the new value, it may include displaying a series of prompts that each requests part of a complex response, etc. Additionally, some applications may lend themselves to direct modification in the graphical canvas area 110 (e.g. by changing a value of the automation shown in FIG. 3B using the drop-down list at 113).

Block 570 indicates that the user may choose to assign a new value to a property by dragging an existing target object onto the graphical canvas, positioning the dragged object over the component or property selected for modification. When this approach to modification has been chosen, Block 580 assigns the dragged value to the property or component over which it has been positioned.

Block 590 is reached when the user is finished entering a new value for a property at Block 560, has dragged an object for modification at Block 580, or when the test at Block 570 had a negative response (for example, if the user changed his mind about making a modification). Block 580 asks whether the user is done making modifications to the selected target object. If this test has a positive response, control returns to Block 400. Otherwise, control returns to Block 530, enabling the user to select another component from the graphical canvas. Optionally, the user could be asked if he would like to save the changes he has made before returning to Block 530. Further, the graphical canvas may need to be repainted before returning to Block 530. This repainting may be done each time a change has been made to the target object, or a test may be included to check whether the canvas will be displayed differently, and only repainted when this test has a positive response.

Block 600 is reached when the user selected neither to create a new target object, nor to modify an existing object. Block 600 asks whether the user wants to quit using this application. If the answer is "Yes", the process of FIG. 4 ends. Otherwise, control returns to Block 400.

As shown in FIG. 4, the creation and modification processes of the present invention are well integrated, giving the user a visual sense of "Where do I start?" and "What do I do next?", regardless of whether he is creating or modifying targets objects. In addition, by using the integrated interface, the knowledge learned while using the wizard naturally transfers to the daily operational interface. Efficient use of the display screen space is made, by having the graphical canvas 110, wizard area 150, and details notebook 160 all viewable at the same time. In this way, the user is able to get a better sense of the overall environment in which he is currently working. Further, there is no proliferation of windows. Details are presented to the user only when they are relevant to the task at hand, enabling him to stay well focused on his task.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

I claim:

1. A method for providing an interface which integrates procedural and object information, said method comprising the steps of:
   displaying a user interface for an application program, wherein said user interface further comprises:
      a graphical canvas for iconic representation of information used by said application program;
      a wizard area for textual representation of prompting information to guide a user of said application program; and
      a details notebook area for selective use by said user;
   creating or modifying an object using a first task of said application program, wherein said creating or modifying step uses a text-driven procedural interface and further comprises the steps of:
      selecting, by said user, a target object for use by said creating or modifying step;
      for each of one or more subtasks of said first task, receiving user input as required to complete said subtask, further comprising the steps of:
         displaying one or more prompting messages for said subtask in said wizard area;
         displaying zero or more applicable properties for said subtask in said details notebook area; and
         responding by said user, by answering said prompting messages in said wizard area or by choosing a value for one or more selected ones of said applicable properties in said details notebook area;
      incrementally building said iconic representation for said target object on said graphical canvas, using said received user input, as said user interacts with said wizard area and said details notebook area; and
      storing said incrementally built iconic representation for said target object; and
   using said created or modified object to perform a second task of said application from said graphical canvas, wherein said using step uses an object interface and further comprises the steps of:
      selecting, by said user, said created or modified object using a pointing device;
      displaying said stored iconic representation of said selected object on said graphical canvas; and
      graphically interacting, by said user, with said displayed iconic representation.

2. The method according to claim 1, wherein said creating or modifying step further comprises the step of recursively invoking said creating or modifying step to provide a nested prompting wizard.

3. The method according to claim 1, wherein said incrementally built iconic representation displays a visual indicator of a completion status of said target object.

4. The method according to claim 1, wherein said first task is creation of an automation and said second task is operation of said automation.

5. The method according to claim 1, wherein said first task is creation of a configuration and said second task is operation using said configuration.

6. A system for providing an interface which integrates procedural and object information, said system comprising:
   means for displaying a user interface for an application program, wherein said user interface further comprises:

a graphical canvas for iconic representation of information used by said application program;

a wizard area for textual representation of prompting information to guide a user of said application program; and a details notebook area for selective use by said user;

means for creating or modifying an object using a first task of said application program, wherein said means for creating or modifying uses a text-driven procedural interface and further comprises:

means for selecting, by said user, a target object for said use by said means for creating or modifying;

for each of one or more subtasks of said first task, means for receiving user input as required to complete said subtask, further comprising:

means for displaying one or more prompting messages for said subtask in said wizard area;

means for displaying zero or more applicable properties for said subtask in said details notebook area; and means for responding, by said user, by answering said prompting messages in said wizard area or by choosing a value for one or more selected ones of said applicable properties in said details notebook area;

means for incrementally building said iconic representation for said target object on said graphical canvas, using said received user input, as said user interacts with said wizard area and said details notebook area; and means for storing said incrementally built iconic representation for said target object; and means for using said created or modified object to perform a second task of said application from said graphical canvas, wherein said means for using uses an object interface and further comprises:

means for selecting, by said user, said created or modified object using a pointing device;

means for displaying said stored iconic representation of said selected object on said graphical canvas; and means for graphically interacting, by said user, with said displayed iconic representation.

7. The system according to claim 6, wherein said means for creating or modifying further comprises means for recursively invoking said means for creating or modifying to provide a nested prompting wizard.

8. The system according to claim 6, wherein said incrementally built iconic representation displays a visual indicator of a completion status of said target object.

9. The system according to claim 6, wherein said first task is creation of an automation and said second task is operation of said automation.

10. The system according to claim 6, wherein said first task is creation of a configuration and said second task is operation using said configuration.

11. Computer readable code for providing an interface which integrates procedural and object information, said computer readable code embodied on a computer readable medium and comprising:

a subprocess for displaying a user interface for an application program, wherein said user interface further comprises:

a graphical canvas for iconic representation of information used by said application program;

a wizard area for textual representation of prompting information to guide a user said application program; and a details notebook area for selective use by said user;

a subprocess for creating or modifying an object using a first task of said application program, wherein said subprocess for creating or modifying uses a text-driven procedural interface and further comprises:

a subprocess for selecting, by said user, a target object for said use by said subprocess for creating or modifying;

for each of one or more subtasks of said first task, a subprocess for receiving user input as required to complete said subtask, further comprising:

a subprocess for displaying one or more prompting messages for said subtask in said wizard area;

a subprocess for displaying zero or more applicable properties for said subtask in said details notebook area; and a subprocess for responding, by said user, by answering said prompting messages in said wizard area or by choosing a value for one or more selected ones of said applicable properties in said details notebook area;

a subprocess for incrementally building said iconic representation for said target object on said graphical canvas, using said received user input, as said user interacts with said wizard area and said details notebook area; and a subprocess for storing said incrementally built iconic representation for said target object; and a subprocess for using said created or modified object to perform a second task of said application from said graphical canvas, wherein said subprocess for using uses an object interface and further comprises:

a subprocess for selecting, by said user, said created or modified object using a pointing device;

a subprocess for displaying said stored iconic representation of said selected object on said graphical canvas; and a subprocess for graphically interacting, by said user, with said displayed iconic representation.

12. The computer readable code according to claim 11, wherein said subprocess for creating or modifying further comprises a subprocess for recursively invoking said subprocess for creating or modifying to provide a nested prompting wizard.

13. The computer readable code according to claim 11, wherein said incrementally built iconic representation displays a visual indicator of a completion status of said target object.

14. The computer readable code according to claim 11, wherein said first task is creation of an automation and said second task is operation of said automation.

15. The computer readable code according to claim 11, wherein said first task is creation of a configuration and said second task is operation using said configuration.

* * * * *